United States Patent [19]

Strömberg

[11] 4,212,579

[45] Jul. 15, 1980

[54] METHOD AND APPARATUS FOR STACKING BALES

[75] Inventor: Nils E. Strömberg, Sundsvall, Sweden

[73] Assignee: Sunds Aktiebolag, Sweden

[21] Appl. No.: 899,319

[22] Filed: Apr. 24, 1978

[30] Foreign Application Priority Data

May 4, 1977 [SE] Sweden ............................. 7705178

[51] Int. Cl.² .......................................... B65G 57/30
[52] U.S. Cl. ................................... 414/95; 198/345; 414/786
[58] Field of Search .................... 214/6 BA, 6 S, 152; 271/212, 233, 238, 240; 198/345; 414/92, 95, 786

[56] References Cited

U.S. PATENT DOCUMENTS

| | | | |
|---|---|---|---|
| 3,035,716 | 5/1962 | Lamb et al. ........................... | 214/6 S |
| 3,037,645 | 6/1962 | Simpkins ........................... | 214/6 BA |
| 3,055,514 | 9/1962 | Dale et al. ........................ | 214/6 BA |
| 3,057,486 | 10/1962 | Moulthrop et al. ............... | 214/6 BA |
| 3,235,100 | 2/1966 | Raynor .............................. | 214/6 BA |
| 3,370,848 | 2/1968 | Bartlett ................................ | 271/221 |
| 3,884,366 | 5/1975 | Leenaards ............................. | 414/95 |
| 3,904,045 | 9/1975 | Thibault ........................... | 214/6 BA |
| 4,004,795 | 1/1977 | Agnew et al. .................... | 271/233 X |

*Primary Examiner*—L. J. Paperner
*Attorney, Agent, or Firm*—Lerner, David, Littenberg & Samuel

[57] ABSTRACT

Bales are stacked at a fixed station within a conveyor transport path. The bales are positionally adjusted in two directions before being stacked in order to provide compact and stable stacks. The completed stacks are subsequently moved along the transport path without the necessity of any concurrent relocation of the stacking apparatus.

12 Claims, 12 Drawing Figures

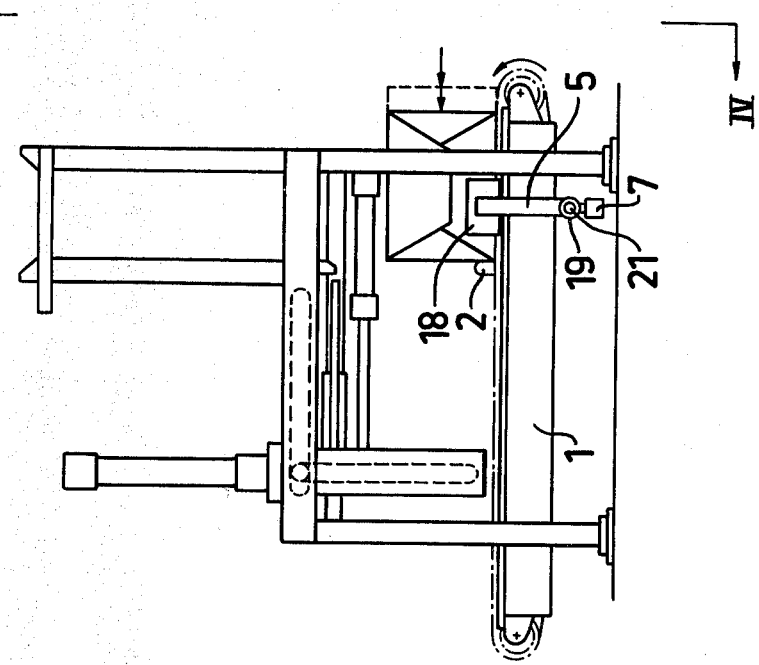
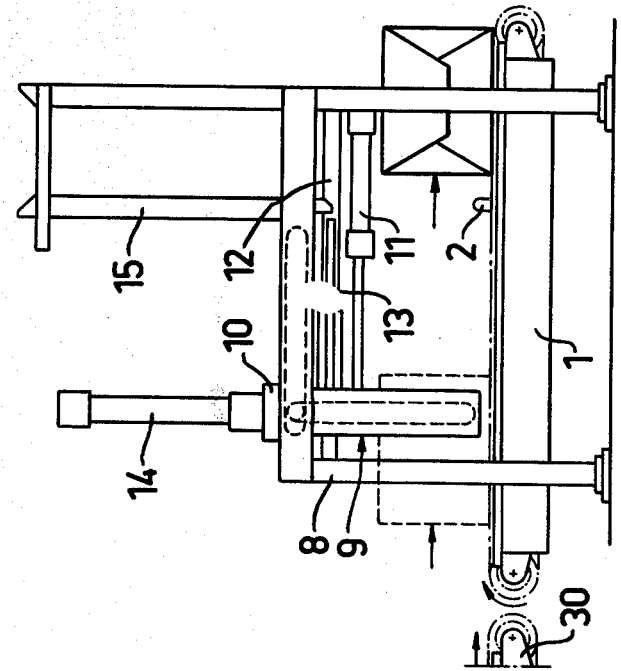

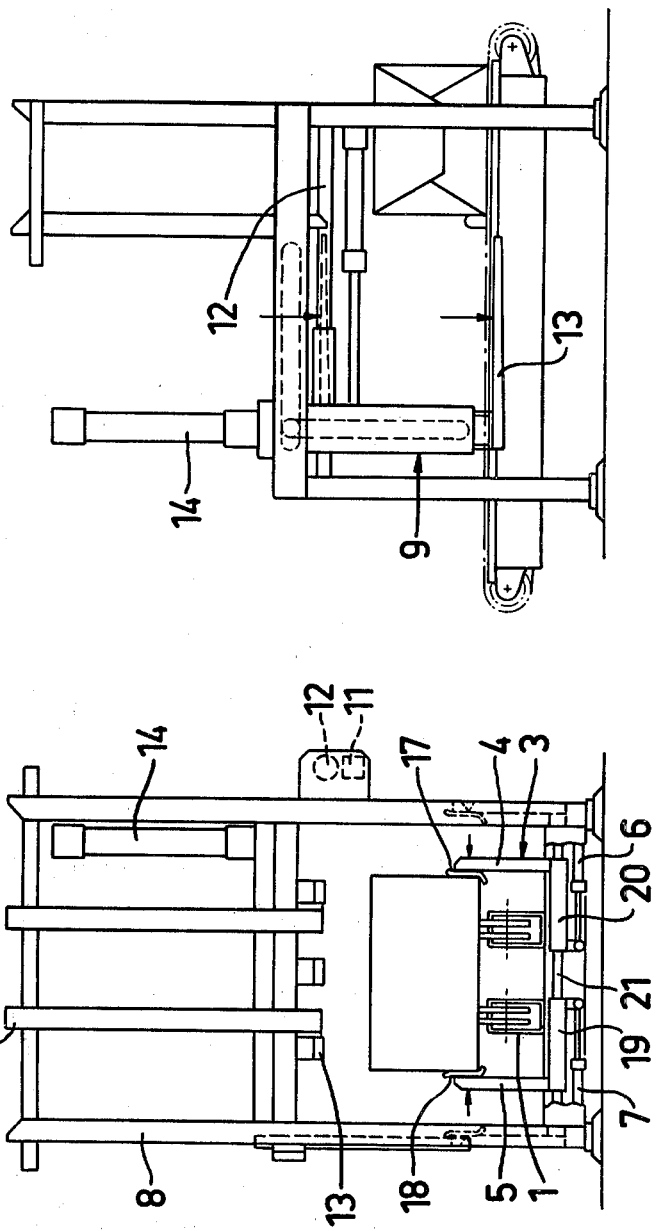

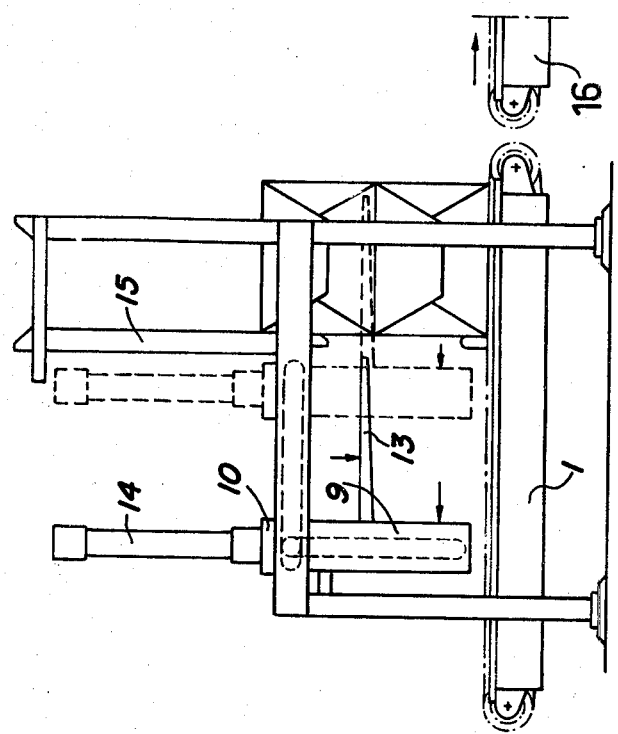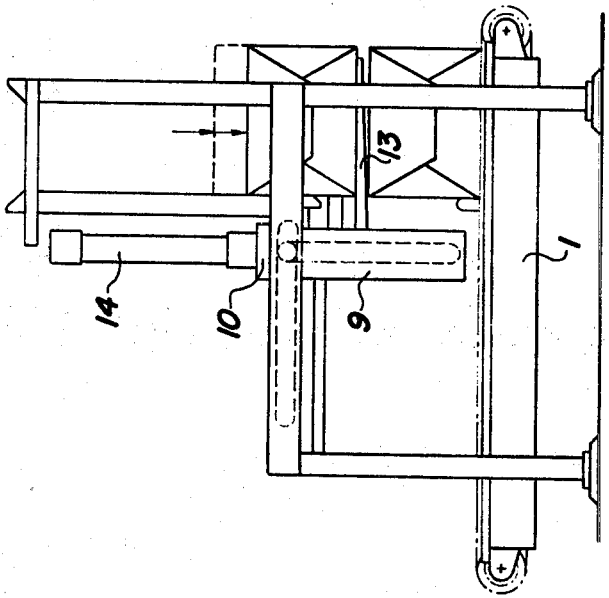

METHOD AND APPARATUS FOR STACKING BALES

BACKGROUND OF THE INVENTION

This invention relates to a method and an apparatus for stacking bales, and more particularly to stacking bales of fibre material, such as cellulose pulp.

A method often applied for the lifting of bales in known types of stackers such as so-called swing stackers is to clamp the bale on opposite sides by means of clamping plates. These devices involve the drawback that the unevenness, which at the pressing of the bales can arise in the bale sides, causes the bale to assume an inclined position, with the risk of tilting of the bale stack. These devices moreover, cannot be used for "wet pulp" with a dry content of 50 percent, because the bale is deformed by the lateral pressure. These devices are not suitable, either, for use with so-called large bales, comprising for example four stacks of sheet pulp which are lifted in unbound state for being transported to a unit load binding machine.

In order to overcome these drawbacks, the use of fork trucks has been proposed, but with conventional arrangements it has not been possible, subsequent to the stacking of the bales, to directly continue the transport in the previous direction of transport. The entire bale stacking apparatus, for example, has to be moved to a position where the bale stack could be delivered for further transport.

It is therefore an object of the present invention to render it possible to maintain the direction of transport, so that the bale stacker can be mounted in a stationary position in a transport path, thereby rendering the apparatus simpler and more reliable in operation.

SUMMARY OF THE INVENTION

The foregoing and additional objects are obtained in accordance with the principles of this invention by providing a bale stacking method and apparatus wherein bales are stacked at a station fixed within the transport path. The bales are advanced on a conveyor to a stacking position where the first bale is lifted up so that a subsequent bale can be moved beneath the lifted bale, which thereafter is positioned upon said subsequent bale. At the next step, the two stacked bales are lifted and a third bale is moved beneath the same. This procedure is repeated until the stack comprises the desired number of bales. The stack is then moved along the transport path while at the same time the next bale is moved into the stacking position.

The invention also provides dual adjustment means so that the bales can be adjusted in two directions, i.e. both in the direction of transport and in a lateral direction. This results in straight and stable stacks, which feature is of great importance for minimizing the size of the storage space required and for safety because of reduced tilting risk.

BRIEF DESCRIPTION OF THE DRAWING

The invention will be more clearly understood upon reading of the following detailed description in conjunction with the drawing, wherein:

FIG. 2 depicts a side view of the apparatus of FIG. 1 with a bale moved slightly past the stacking position.

FIG. 3 shows the apparatus of FIG. 1 with the bale moved back to the stacking position.

FIG. 4 depicts an end view of the apparatus of FIG. 1, showing the operation of the lateral adjustment devices.

FIG. 5 shows the apparatus of FIG. 1 with the lift fork moved to its lowest position.

FIGS. 6-12 show the normal sequence of positions for the apparatus of FIG. 1 as it is used to align, stack and discharge bales.

DETAILED DESCRIPTION

Figure 1:
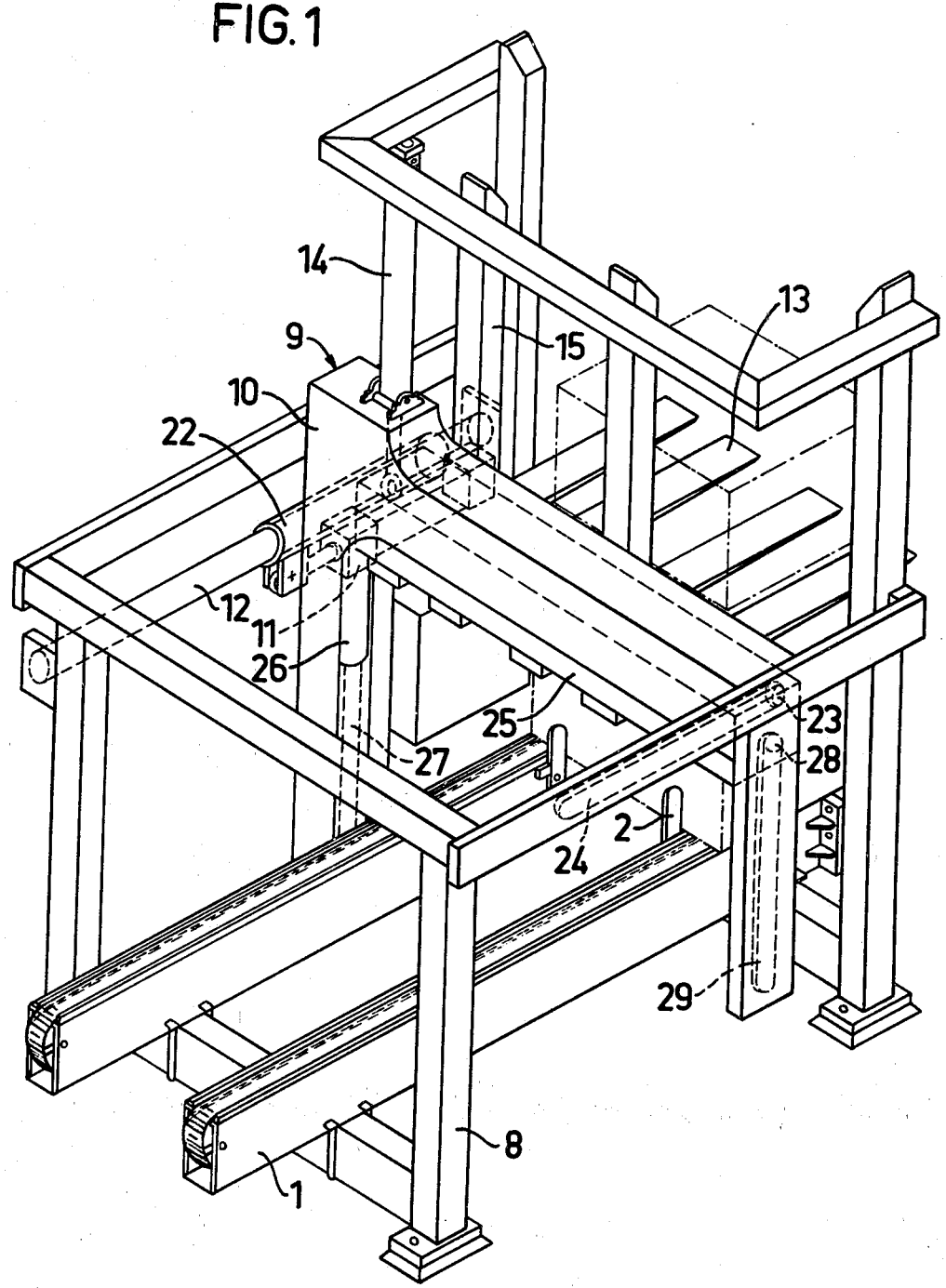
FIG. 1 shows a perspective view of a bale stacking apparatus constructed in accordance with the principles of this invention.

The apparatus according to the preferred embodiment as shown in FIG. 1 comprises a feed conveyor 1, which advances the bales one by one to a stacking position. The individual bales are supplied to the feed conveyor 1 by a supply conveyor 30 as shown in FIG. 2. In order to obtain a stacking position accurately defined in the feed direction, folding stop members 2A and 2B are provided adjacent to the feed conveyor as shown in FIG. 1. A position sensing device (not shown) indicates that the bale has moved past the stop members 2A and 2B and the conveyor 1 then is reversed so that the bale is moved backward to the stop members as shown in FIGS. 2 and 3.

At the stacking position, shown in FIG. 4, a lateral adjustment device 3 is provided which comprises two arms 4, 5 located one on each side of the conveyor 1. The arms 4, 5 carry lateral direction plates 17, 18 and are operated by hydraulic cylinders 6, 7 so that the bale is centered laterally on the conveyor 1. The arms 4, 5 in their turn are supported by sleeves 19, 20 running on a guide means 21.

Above the conveyor 1, a stand 8 (shown in FIG. 1) is mounted, in which a lift fork device 9 is provided which comprises a carriage 10, which is movable on one side of the stand in a sleeve 22 by means of a hydraulic cylinder 11 along a guide means 12. On the other side of the stand the carriage 10 is guided by a roller 23 running in a guide means 24. This arrangement prevents unwanted clamping between the two guide means 12, 24 which substantially are in parallel with the conveyor 1.

The carriage 10 supports a lift fork 13 for the bales by means of a cross-beam 25, which can be lifted and lowered vertically by means of hydraulic cylinder 14. The movement is guided on one side of the cross-beam 25 by a sleeve 26 running along a guide means 27 and on the other side by means of a roller 28 running in a guide means 29.

The lift fork device 9 is located above the stacking position so that the bales move under the device 9 to the stacking position. The further transport of the bale stack is not prevented thereby.

The stand 8 further comprises vertical stop bars 15 located straight above the stop members 2A and 2B. Said stop bars 15 are intended to support the bale stack when it is being built up and to render it possible to pull out the lift fork 13 from the stack. Directly adjacent to the stacking position, on the same level as the feed conveyor 1 and substantially aligned therewith, a receiving conveyor 16 (shown in FIG. 12) is provided for further transport of the bale stack.

Figure 7:
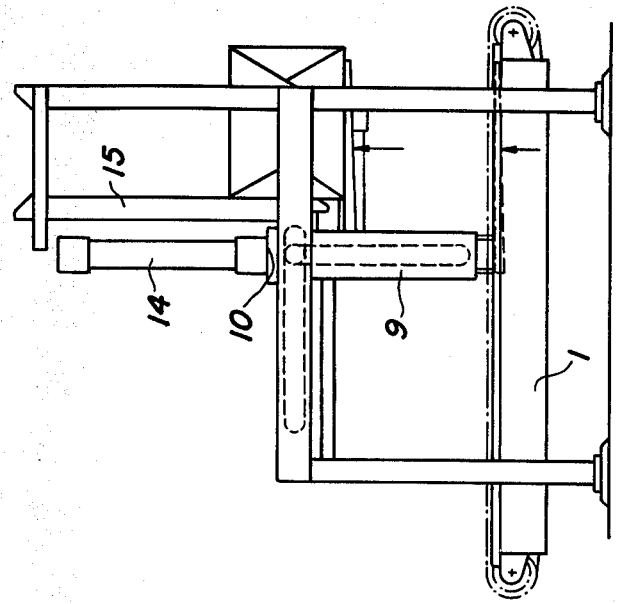
Figure 6:
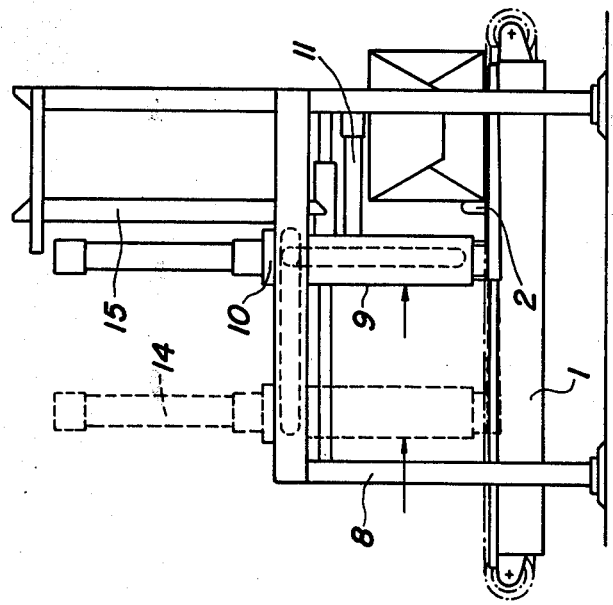
Figure 9:
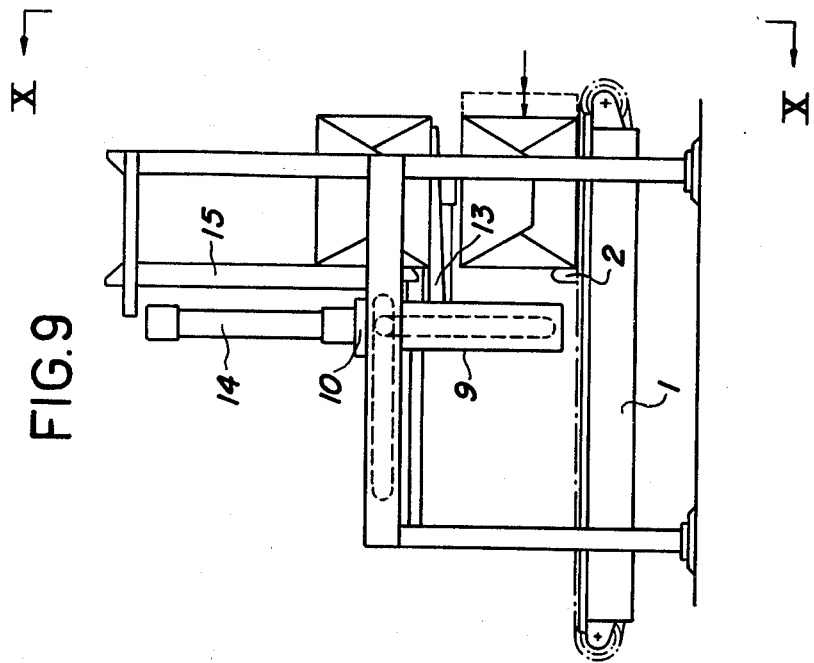
Figure 8:
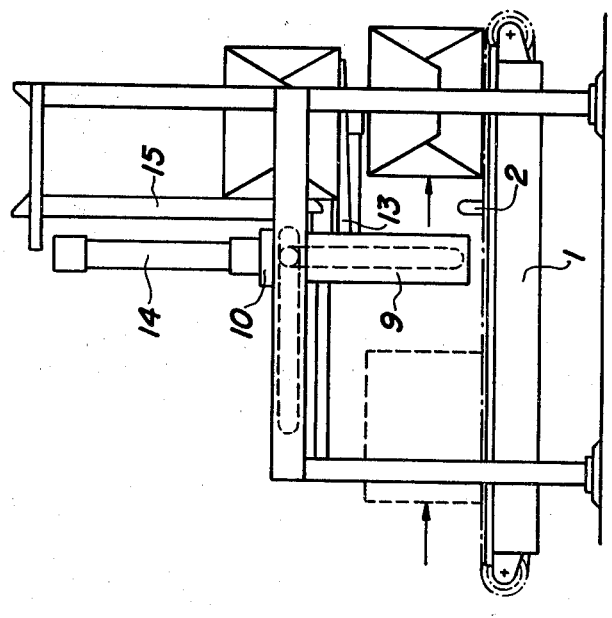
Figure 10:
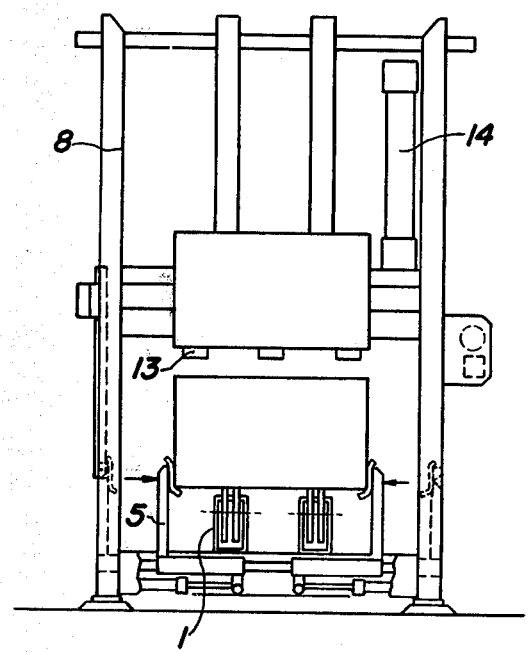

The apparatus operates as follows. A bale is advanced by the conveyor 1 past the stop member 2, whereafter the conveyor is stopped (see FIG. 2). The conveyor 1 is reversed and the bale is moved against the stop members 2A and 2B, which define the stacking position (see FIG. 3). The centering in lateral direction is effected by means of the lateral direction device 3 (see FIG. 4). The lift fork 13, which at the same time is in its upper position, is lowered to its rear lower position on the same level as the conveyor 1 (see FIG. 5) and is moved forward to its forward lower position beneath the bale (see FIG. 6). The lift for is lifted to its forward upper position, thereby lifting the bale (see FIG. 7). The subsequent bale now can pass beneath the lifted bale (see FIG. 8) where it is properly aligned in the direction of transport (see FIG. 9) and in the lateral direction (see FIG. 10). Thereafter the lift fork 13 is lowered so that the first bale is positioned immediately above the second one (see FIG. 11). The fork 13 is then pulled back, and the stop bars 15 retain the uppermost bale in the stacking position (see FIG. 12). Thereafter the fork 13 is lowered to its rear lower position corresponding to the position shown in FIG. 5.

The above-described procedure is repeated until the desired number of bales are included in the stack, whereafter the bale stack is transferred to the receiving conveyor 16 (shown in FIG. 12) for transport to subsequent working steps. At the same time, the first bale in the next stack is advanced by the conveyor 1.

The invention, of course, is not restricted to the embodiment described, but can be readily varied by those skilled in the art within the scope of the following claims.

What is claimed is:

1. A method of stacking bales, comprising the steps of advancing the bales one by one in a first direction along a transport path by means of a feed conveyor to a stacking position, lifting the first bale from said stacking position to a raised position by a fork device, maintaining said first bale in said raised position with said fork device while a subsequent bale is advanced to said stacking position beneath the lifted bale, lowering said fork device toward the subsequent bale, retracting said fork device from between said first bale and said subsequent bale in a direction opposite to the first direction in which said bales are advanced so that said first bale is lowered into contact with said subsequent bale in said stacking position, lowering said retracted fork device so that it is ready to be moved forward to said stacking position, repeating the above-said steps until the desired number of bales have been positioned upon each other to form a stack in said stacking position, and moving the completed stack from said stacking position in said first direction and along said transport path directly to a receiving conveyor substantially aligned with said feed conveyor.

2. A method according to claim 1, wherein the advancing step includes advancing each of said bales by said feed conveyor past said stacking position, and moving each of said bales back against a stop member for accurate placement of each of said bales in said stacking position.

3. A method according to claim 1, further including the step of centering each of said bales in a lateral direction in said stacking position prior to said lifting of said bale.

4. A method according to claim 1, wherein a first bale of a subsequent stack is moved to said stacking position at the same time that said completed stack is being moved to said receiving conveyor.

5. Apparatus for stacking bales comprising a feed conveyor for advancing said bales one by one in a first direction along a feeding path to a stacking position, a lift fork device including a lift fork for lifting said bales from said stacking position to a height exceeding the height of a bale and for lowering said lifted bales on subsequent bales in said stacking position and for moving in said first direction and for retraction from under said bales in a direction opposite to said first direction parallel to said feeding path to define a substantially rectilinear path of movement to form a stack of such bales in said stacking position, means for supporting and moving said lift fork along said rectilinear path including a carriage movable along guide means parallel to said feed conveyor and including drive means for moving said lift fork in a vertical direction, said supporting and moving means being disposed on opposite sides of said feeding path forward of said stacking position so that said bales can be advanced along said feeding path to said stacking position and so that said completed stack can be discharged from said stacking position in said first direction, and a receiving conveyor located adjacent said stacking position in substantial alignment with said feed conveyor such that said feed conveyor can feed completed stacks of bales from said stacking position in said first direction and along said feeding path directly onto said receiving conveyor.

6. The apparatus of claim 5, wherein a folding stop member is located at said stacking position which permits the advancement of said bales past said stacking position but stops said bales upon the reversal of said feed conveyor for accurate placement of said bales in said stacking position.

7. The apparatus of claim 5, wherein a lateral adjustment device is located adjacent to said stacking position for centering said bales in said stacking position.

8. The apparatus of claim 7, wherein said lateral adjustment device comprises two plates, said plates being positioned on opposite sides of said feed conveyor, and each of which plates being movable in a lateral direction by means of an associated hydraulic control cylinder.

9. The apparatus of claim 5, including a supply conveyor positioned adjacent to said feed conveyor, for advancing said bales to said feed conveyor.

10. Apparatus for stacking bales comprising a feed conveyor for advancing said bales one by one in a first direction along a feeding path to a stacking position, a lift fork disposed for movement relative to said feed conveyor, first means for moving said lift fork from a starting position in a forward direction parallel to said feed conveyor and into position under a first bale in said stacking position, second means for vertically driving said lift fork to lift said first bale from said stacking position to a raised position and for lowering said first bale onto a second bale advanced to said stacking position to form a stack of bales in said stacking position, said first means including means for retracting said lift fork in a direction opposite to said first direction from under said first bale, said second means being operable to lower said lift fork to said starting position, said first and second means being disposed on opposite sides of said feeding path forward of said stacking position so that said bales can be advanced along said feeding path to said stacking position and so that a completed stack of bales can be discharged from said stacking position in said first direction along said feeding path.

11. Apparatus in accordance with claim 10, wherein said first means includes a reciprocating carriage movable along guide means.

12. Apparatus in accordance with claim 10, wherein said second means includes a hydraulic cylinder for vertically driving said lift fork.

* * * * *